United States Patent
Park et al.

(10) Patent No.: US 9,777,938 B2
(45) Date of Patent: Oct. 3, 2017

(54) INSTALLATION GUIDE SYSTEM FOR AIR CONDITIONER AND METHOD OF USING THE SAME

(71) Applicant: LG ELECTRONICS INC., Seoul (KR)

(72) Inventors: Jungyul Park, Changwon-si (KR); Sangeun Cho, Changwon-si (KR); Shinae Kang, Changwon-si (KR); Junmo Kim, Changwon-si (KR); Mingyu Park, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 436 days.

(21) Appl. No.: 14/071,940

(22) Filed: Nov. 5, 2013

(65) Prior Publication Data
US 2014/0148955 A1    May 29, 2014

(30) Foreign Application Priority Data
Nov. 27, 2012    (KR) .................... 10-2012-0135500

(51) Int. Cl.
*F24F 11/00*    (2006.01)
*G06F 17/50*    (2006.01)
*F24F 1/26*    (2011.01)

(52) U.S. Cl.
CPC ...... *F24F 11/0086* (2013.01); *G06F 17/5004* (2013.01); *F24F 1/26* (2013.01);
(Continued)

(58) Field of Classification Search
CPC .. F24F 11/0086; F24F 1/26; F24F 2011/0091; F24F 2221/32; G06F 17/5004; G06F 2217/34
(Continued)

(56) References Cited

U.S. PATENT DOCUMENTS 4,551,810 A * 11/1985 Levine .................. G06F 17/509
                                                         700/163
5,557,537 A *  9/1996 Normann .............. G06F 17/509
                                                         434/72
(Continued)

FOREIGN PATENT DOCUMENTS

CN        101067315        11/2007
CN        101923587        12/2010
(Continued)

OTHER PUBLICATIONS

International Search Report dated Apr. 4, 2014 issued in application No. PCT/KR 2013/010813.
(Continued)

*Primary Examiner* — Kenneth M Lo
*Assistant Examiner* — Michael J Huntley
(74) *Attorney, Agent, or Firm* — Ked & Associates, LLP

(57) ABSTRACT

Provided is an installation guide system for an air conditioner. The installation guide system may include a display that displays a user interface for designing an installation for an air conditioner, a memory that stores at least one image for a building in which the air conditioner is installed, and a controller to control a display of the stored images on the user interface. The user interface may include a first region that displays the stored image including a plurality of tubes that connect an indoor unit to an outdoor unit of the air conditioner, and a second region that displays information regarding an interference between at least two of the plurality of tubes.

9 Claims, 17 Drawing Sheets

(52) U.S. Cl.
CPC ... *F24F 2011/0091* (2013.01); *F24F 2221/32* (2013.01); *G06F 2217/34* (2013.01)

(58) Field of Classification Search
USPC .......................................................... 700/276
See application file for complete search history.

(56) References Cited

U.S. PATENT DOCUMENTS

| | | | |
|---|---|---|---|
| 7,702,421 B2 * | 4/2010 | Sullivan | F24F 11/0009 236/51 |
| 8,249,841 B1 | 8/2012 | Ferrer | |
| 8,260,581 B2 | 9/2012 | Hoguet | |
| 2005/0109047 A1 | 5/2005 | Park | |
| 2005/0165591 A1 | 7/2005 | Bahel et al. | 703/7 |
| 2006/0247902 A1 * | 11/2006 | Rourke | G06F 17/5004 703/1 |
| 2007/0186149 A1 * | 8/2007 | Ghantous | G06T 19/20 715/209 |
| 2007/0219764 A1 * | 9/2007 | Backe | G06F 17/5004 703/6 |
| 2007/0288207 A1 | 12/2007 | Backe et al. | 703/1 |
| 2008/0015824 A1 * | 1/2008 | Grichnik | G06F 17/509 703/1 |
| 2008/0209907 A1 | 9/2008 | Xiao et al. | 60/641.15 |
| 2008/0309678 A1 * | 12/2008 | Reghetti | G06F 17/50 345/635 |
| 2009/0024374 A1 | 1/2009 | Zielinski et al. | 703/8 |
| 2009/0076779 A1 | 3/2009 | Simmons et al. | |
| 2009/0307255 A1 | 12/2009 | Park | |
| 2010/0066559 A1 * | 3/2010 | Judelson | G06T 19/00 340/8.1 |
| 2010/0138762 A1 * | 6/2010 | Reghetti | G06T 19/20 715/765 |
| 2010/0217724 A1 * | 8/2010 | Wayne | G06Q 10/067 705/348 |
| 2010/0223032 A1 * | 9/2010 | Reghetti | G06T 19/20 703/1 |
| 2012/0072181 A1 | 3/2012 | Imani | 703/1 |
| 2012/0101778 A1 | 4/2012 | Gyota et al. | 702/183 |
| 2013/0261805 A1 | 10/2013 | Kuroiwa | |

FOREIGN PATENT DOCUMENTS

| | | |
|---|---|---|
| CN | 102033992 | 4/2011 |
| CN | 102782689 | 11/2012 |
| EP | 1 939 813 A1 | 7/2007 |
| EP | 2 442 042 A1 | 4/2012 |
| JP | 2009530720 A | 8/2009 |
| KR | 10-2002-0002894 | 1/2002 |
| WO | WO 2010/143340 A1 | 12/2010 |
| WO | WO 2012/101787 | 8/2012 |

OTHER PUBLICATIONS

European Search Report dated Apr. 14, 2014 issued in application No. 13171829.8.
Chinese Office Action dated Jun. 17, 2016 issued in Application No. 2013800085785.
Chinese Search Report dated Jun. 21, 2016 issued in Application No. 2013800085770.
U.S. Office Action dated Aug. 16, 2016 issued in co-pending U.S. Appl. No. 14/072,045.
U.S. Office Action dated Aug. 11, 2016 issued in co-pending U.S. Appl. No. 14/072,110.
U.S. Office Action dated Apr. 19, 2016 issued in co-pending U.S. Appl. No. 14/072,110.
Korean Office Action dated Dec. 11, 2015 issued in Application No. 10-2012-0135501.
U.S. Office Action dated Apr. 29, 2016 issued in co-pending U.S. Appl. No. 14/072,045.
U.S. Office Action dated May 8, 2017 issued in co-pending U.S. Appl. No. 14/072,110.
Korean Office Action dated Jul. 12, 2016 issued in Application No. 10-2012-0135403.
Chinese Office Action dated Jul. 19, 2016 issued in Application No. 201380008599.7.
U.S. Office Action dated May 10, 2017 issued in co-pending U.S. Appl. No. 14/072,045.

* cited by examiner

INSTALLATION GUIDE SYSTEM FOR AIR CONDITIONER AND METHOD OF USING THE SAME

CROSS-REFERENCE TO RELATED APPLICATION(S)

The present application claims priority under 35 U.S.C. 119 and 35 U.S.C. 365 to Korean Patent Application No. 10-2012-0135500 filed on Nov. 27, 2012, which is hereby incorporated by reference in its entirety.

BACKGROUND

1. Field

Provided is an installation guide system for an air conditioner and a method of using the same.

2. Background

Installation guide systems for air conditioner and methods of using the same are known. However, they suffer from various disadvantages.

Air conditioners are home appliances that maintain indoor air into the most proper state according to use and purpose thereof. For example, such an air conditioner cools indoor air in the summer and heats indoor air in the winter. Furthermore, the air conditioner may control humidity of the indoor air and may purify the indoor air to provide a more pleasant and clean air.

In detail, the air conditioner has a refrigeration cycle in which compression, condensation, expansion, and evaporation processes for a refrigerant are performed. Thus, a cooling or heating operation of the air conditioner may be performed to cool or heat the indoor air according to the refrigeration cycle.

Such an air conditioner may be classified into a split type air conditioner in which indoor and outdoor units are separated from each other and an integral type air conditioner in which indoor and outdoor units are integrally coupled to each other as a single device, according to whether the indoor and outdoor units are separated from each other.

The outdoor unit includes an outdoor heat exchanger heat-exchanging with external air, and the indoor unit includes an indoor heat exchanger heat-exchanging with indoor air. The air conditioner may operate in a cooling mode or heating mode which are capable of being converted with respect to each other.

An air conditioner may be installed so that a plurality of indoor or outdoor units may be provided in one building. Particularly, in a case of a commercial air conditioner, high-capacity outdoor units may be disposed outside the building, and indoor units may be installed so that the indoor units are respectively disposed in a plurality of spaces of the floors.

In the air conditioner according to the related art, an adequate number of indoor or outdoor units may be provided in consideration of a size and structure of the building and the number of persons to be accommodated within the building so that the indoor or outdoor units are adequately designed in a building design phase to adequately locate the indoor or outdoor units in the building. Also, while the building is being designed, the adequate number of outdoor or indoor units should be selected in consideration of the conditions of the building. In addition, a position of a refrigerant tube, a branch tube, or drain tube and a constitution of a controller should be considered.

However, according to the process of designing the air conditioner in the building, a design drawing of the building and a design drawing of the air conditioner are drawn along different work flows. Thus, since the plurality of drawings may not match each other, it may be difficult to efficiently design the building and install the air conditioner.

Also, since communication between an installer and a user with respect to installation information (building information or capacity of the air conditioner) of the air conditioner may not effectively be performed, the number of outdoor and indoor units which are actually required may not be provided, or the refrigerant tube, and the like, may not be disposed in adequate positions in the building. Also, in the case where the air conditioner is not adequately installed in the building, cooling or heating efficiency of the air conditioner may be reduced during the operation thereof or may cause failures.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to the embodiments of the present disclosure, examples of which are illustrated in the accompanying drawings. The disclosure may, however, be embodied in many different forms and should not be construed as being limited to the embodiments set forth herein; rather, that alternate embodiments included in other retrogressive disclosures or falling within the spirit and scope of the present disclosure will fully convey the concept of the disclosure to those skilled in the art.

Figure 1:
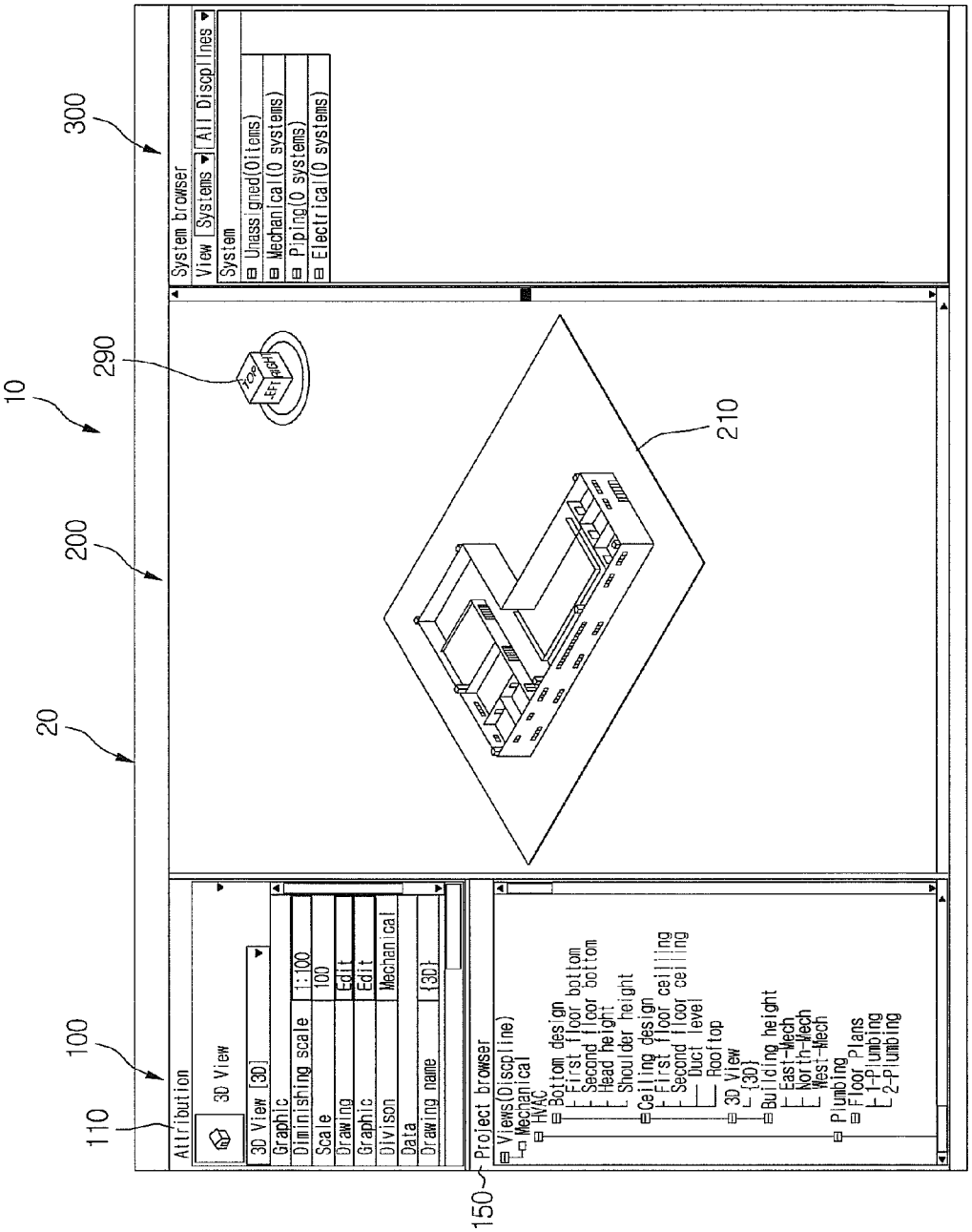
FIG. 1 is a view of an installation guide system according to an embodiment.

FIG. 1 is a view of an installation guide system according to an embodiment. An installation guide system 10 (hereinafter, referred to as a system) may include a display 20 providing guide for an installation (a disposition design) of an air conditioner to a user. The display 20 may be displayed when preset information (e.g., specific program) is executed. The display 20 may be understood as a user interface that outputs information required according to a command input of the user. Here, the specific program may be executed in PCs, terminals, servers, control devices, or another appropriate type of computing device based on the intended application.

The display 20 may include an installation information display part 100 including attribution information of the system 10, project (installation process) information for installing the air conditioner, and information (for example, building information) related to an installation space in which the air conditioner is installed. The installation information display part 100 may be disposed in a partitioned region of the display 20. The installation information display part 100 may be a partitioned window, a window pane, a pop-up window, or the like.

In detail, the installation information display part 100 may include an attribution information display part 110 ("Attribution") on which the attribution information of the system 10 is displayed. The attribution display part 110 may include display information with respect to a drawing included in the system 10. For example, the display information may include drawing scale information, graphic information, and scale information, or the like.

The installation information display part 100 may include a project display part 150 ("Project Browser") on which information with respect to floor and ceiling designs of the building and information with respect to a height of the building are displayed.

The project display part 150 may include a display part (hereinafter, also referred to as a bottom design display part) for confirming or inputting information with respect to the bottom design of the building. For example, when the building has two floors, the bottom design display part may include information with respect to a "first floor bottom," a "second floor bottom," a "head height," and a "shoulder height."

The project display part 150 may include a display part (hereinafter, also referred to as a ceiling design display part) for confirming or inputting information with respect to the ceiling design of the building. For example, when the building has two floors, the ceiling design display part may include information with respect to a "first ceiling mech" and a "second ceiling mech." Also, the two floor ceiling mech may include information with respect to a "duct level (height)" and a "rooftop," for example.

The project display part 150 may include a display part (hereinafter, also referred to as a building height display part) for confirming or inputting information with respect to the height of the building. The building height display part may include a plurality of selection parts for distinguishing and displaying the height of the building according to a view direction. The plurality of selection parts may include an "east-mech" selection part, a "west-mech" selection part, and a "north-mech" selection part.

The display 20 may include a drawing display part 200 on which information with respect to an installation space of the air conditioner, for example, floor information of the building or room information, may be displayed, or disposition information of detailed devices (equipment or components) of the air conditioner may be displayed. The room information may be information with respect to rooms partitioned on each of the floors of the building. Moreover, the drawing display part 200 may be referred to as a window, pane, partition of the display, or the like, which may be separated in the display 20 or viewed as a pop-up window.

A drawing with respect to a structure of the building (e.g., floor plan) may be disposed on the drawing display part 200, and installation information may be displayed on the drawing. The drawing display part 200 may be displayed on the other region of the entire region of the display 20. For example, as shown in FIG. 1, the drawing display part 200 may include a building perspective view 210 on which the structure of the building is three-dimensionally displayed.

Information with respect to a plurality of buildings may be previously stored in the system 10. When one building of the plurality of buildings is imported, as shown in FIG. 1, a structure of a specific building may be displayed as a perspective view.

The drawing display part 200 may include a viewer adjustment part 290 for adjusting a view direction of the building perspective view 210. The user may select the viewer adjustment part 290 to rotate in a specific direction, thereby differently setting the view angle of the building perspective drawing 210. The viewer adjustment part 290 may be an icon, or the like.

The display 20 may include a product information display part 300 ("System Browser") for displaying the detailed constitutions (equipment or components) of the air conditioner disposed in each of the floors or each of the rooms. The product information display part 300 may be displayed in the other region of the entire region of the display 20.

For example, the display 20 may be divided into three regions. Thus, the installation information display part 100, the drawing display part 200, and the product information display part 300 may be disposed in each of the three regions, respectively. Also, the installation information display part 100 and the product information display part 300 may be disposed on both sides of the drawing display part 200.

The installation information display part 100 and the product information display part 300 may be commonly called a "guide display part" in that various menus for disposing the air conditioner on the drawing display part 200 are displayed thereon.

Figure 2:
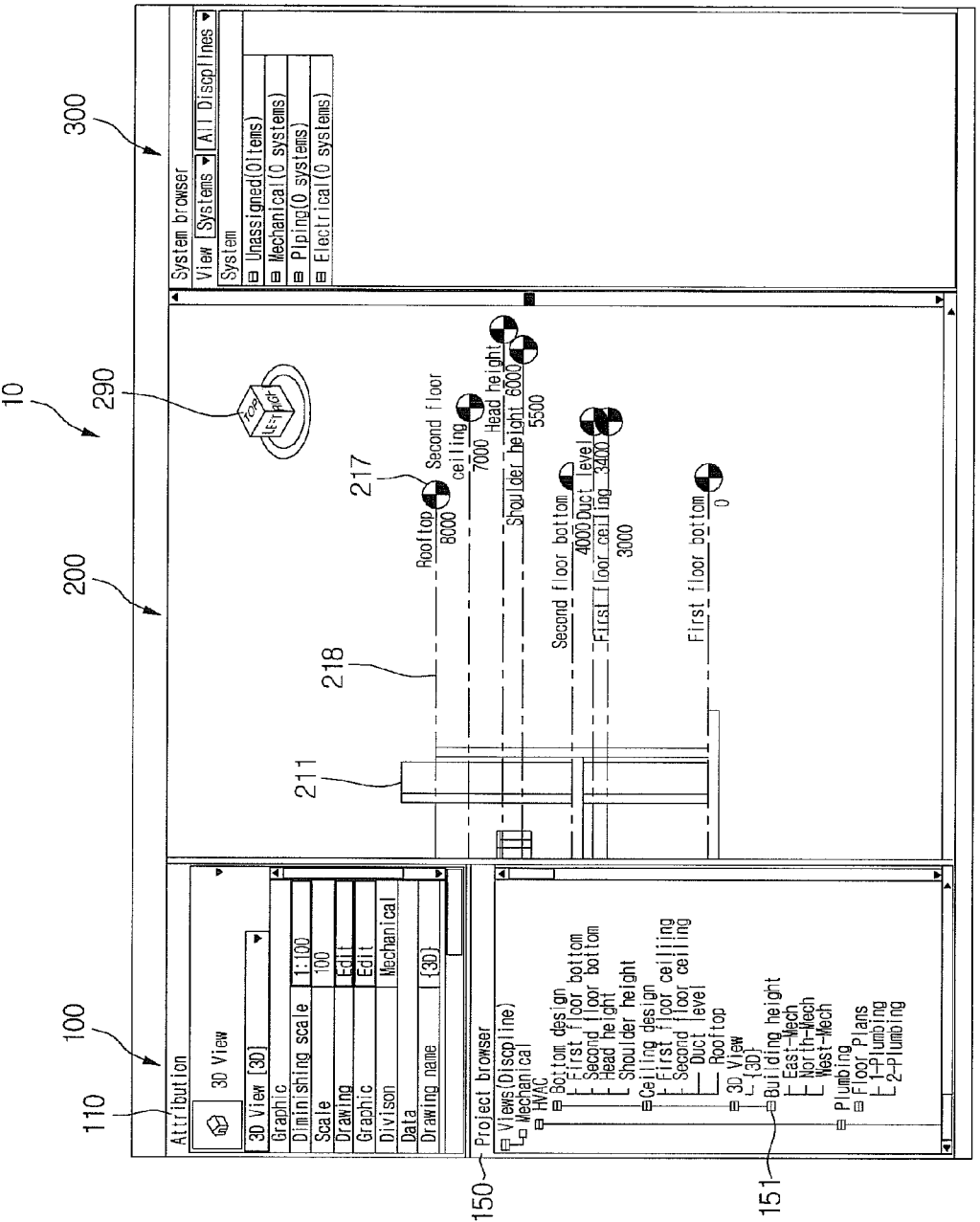
FIG. 2 is a view of the installation guide system with respect to a drawing display part including building level information according to an embodiment.

FIG. 2 is a view of the installation guide system with respect to a drawing display part including building level information according to an embodiment. A front view 211 and height information with respect to the bottom and floor of the building based on the front view 211 may be displayed on the drawing display part 200. Of course, the drawing and the height information may be previously stored in the system 10.

For example, when the building height display part 151 of the project display part 150 is selected, at least one portion of the front view 211 of the building may be displayed on the drawing display part 200, and the information with respect to a height from the bottom of the building to the rooftop of the building may be displayed in a region spaced apart from where the front view 211 is displayed.

For example, when the building has two floors, a plurality of position display parts 217 may be displayed in regions spaced laterally from the front view 211. Positions of components of the building, from the "first floor bottom" that is the lowermost portion relative to the "rooftop" that is the uppermost portion, may be longitudinally displayed.

That is, the position display parts 217 are displayed in a vertical direction to correspond to the components of the building displayed on the front view 211 of the building, as illustrated in FIG. 2. The position display parts 217 may include a "first floor bottom," a "first floor ceiling," a "duct level," a "second floor bottom," a "shoulder height," a "head height," a "second ceiling," a "rooftop" from a lower side to an upper side, or another appropriate measurement.

Also, heights (levels) with respect to each of the components of the building may be displayed on the position display parts 217, respectively. For example, as shown in FIG. 2, the first floor bottom, the first ceiling, the duct level, the second floor bottom, the shoulder height, the head height, the second floor ceiling, and the rooftop may be displayed as about 0, about 3,000 mm, about 3,400 mm, about 4,000 mm, about 5,500 mm, about 6,000 mm, about 7,000 mm, and about 8,000 mm, respectively.

Here, the shoulder height and the head height may be utilized as reference information for installing the air conditioner. For example, the shoulder height and the head may correspond to a height of a window provided in the building or a position of an air discharge hole of the air conditioner.

Level display lines 218 that horizontally extend from the front view 211 to the position display parts 217 may be displayed on the drawing display part 200. The plurality of level display lines 218 may be longitudinally disposed and spaced apart from each other to correspond to the respective components (the rooftop, the ceiling, the bottom, and the like) of the building.

Since the level display lines 218 are provided, the components of the building illustrated in the front view 211 and names of the components displayed on the position display parts 217 may easily be matched to each other. Also, since the information with respect to the height of each of the components of the building is displayed on the drawing display part 200 so that the user can see the height information, the air conditioner may be easily and accurately installed.

Figure 3:
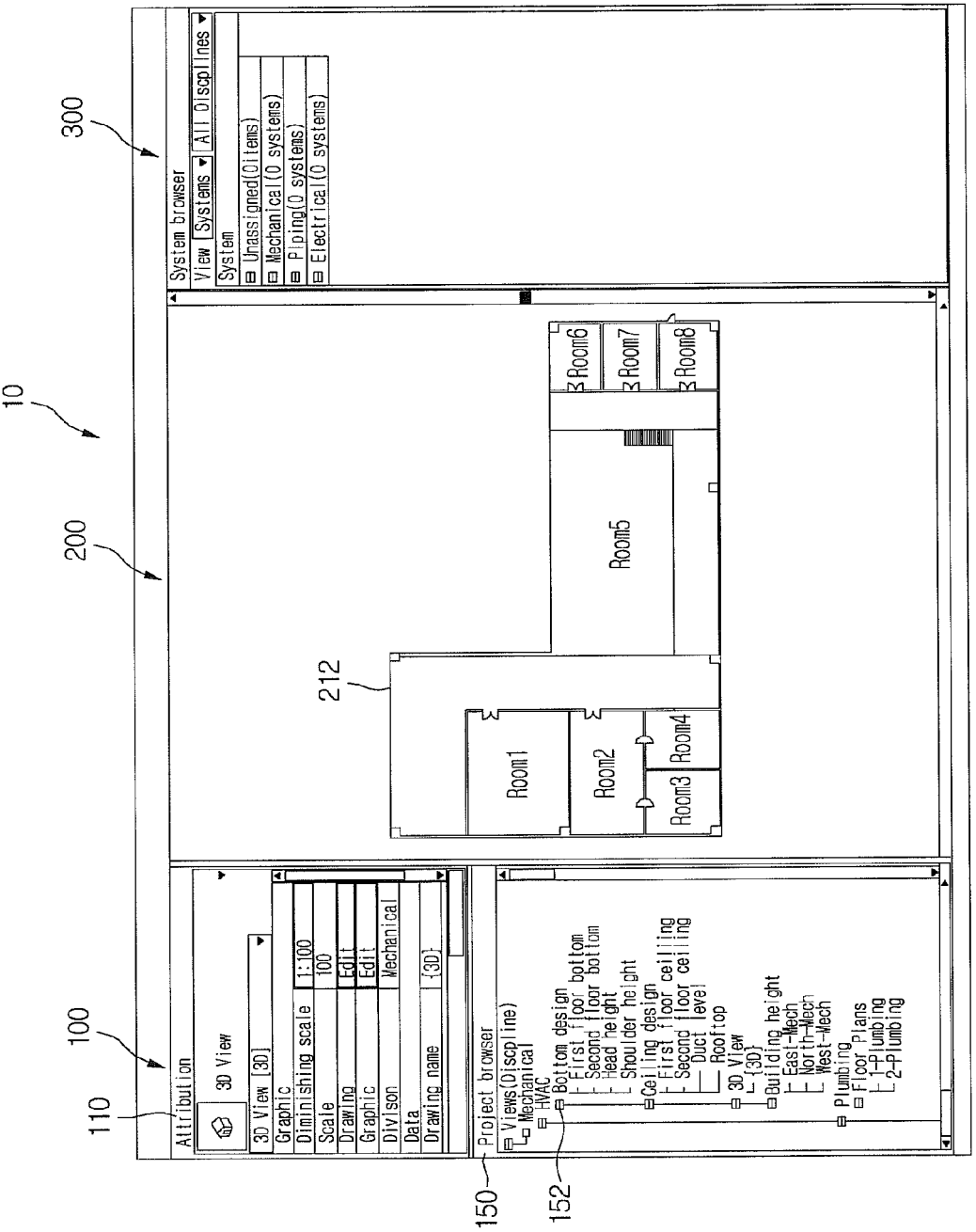
FIG. 3 is a view of the installation guide system with respect to a drawing display part including a building plan view according to an embodiment.

FIG. 3 is a view of the installation guide system with respect to a drawing display part including a building plan view according to an embodiment. A building plan view 212 may be displayed on the drawing display part 200 of the system 10.

In detail, when a bottom design display part 152 of the project display part 150 is selected, the room information with respect to each of the rooms of the building may be displayed on the drawing display part 200. For example, FIG. 3 illustrates a state in which the building plan view 212 including the room information of the second floor of the building when the "second floor bottom" of the bottom design display part is selected.

Also, when an inner region of the building plan view 212 is selected, a room information display part (not shown) may be displayed, for example, in a pop-up window. The room information display part may include information with respect to a room located in each of the floors of the building, for example, a cooling/heating load or capacity of the indoor unit.

As described above, since the information with respect to the room in which the air conditioner is installed may previously be set, the indoor or outdoor unit having specific capacity may be adequately disposed on the basis of the information with respect to the room.

Figure 4:
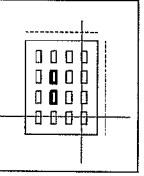
FIG. 4 is a view of an indoor unit automatic disposition display part according to an embodiment.
Figure 5:
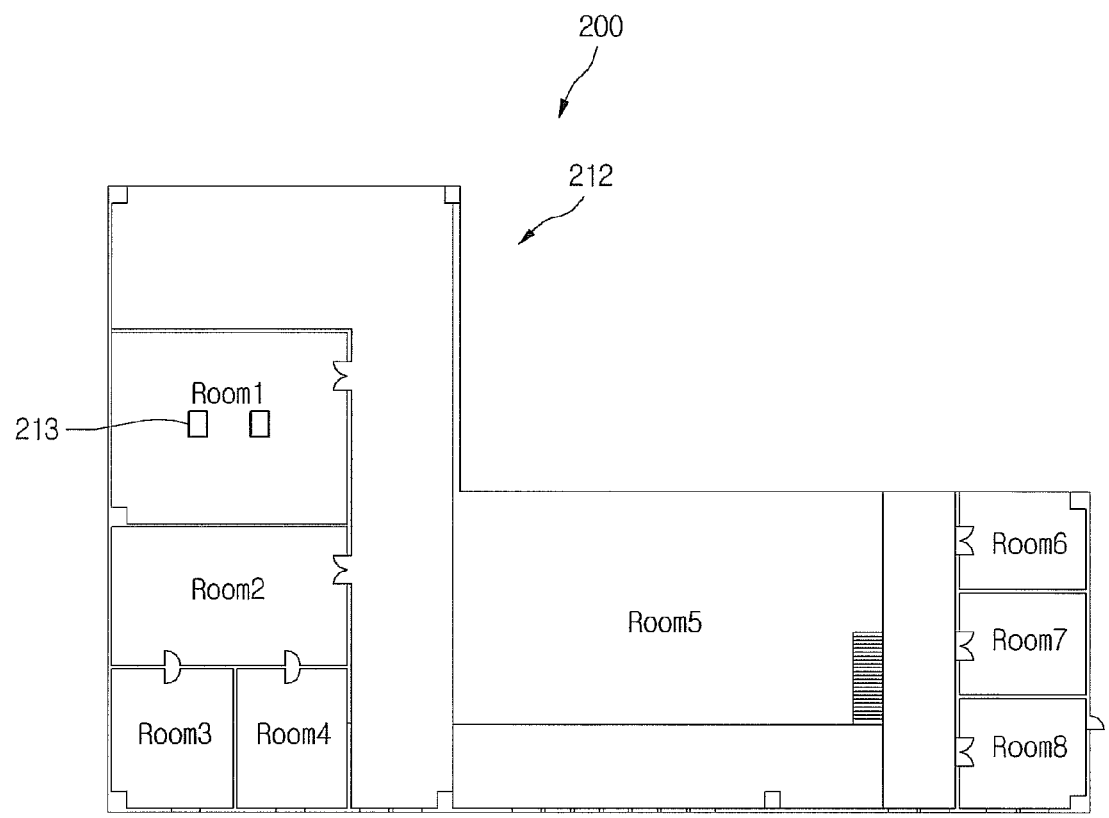
FIGS. 5 and 6 are views of a drawing display part on which an indoor unit is automatically displayed according to an embodiment.
Figure 6:
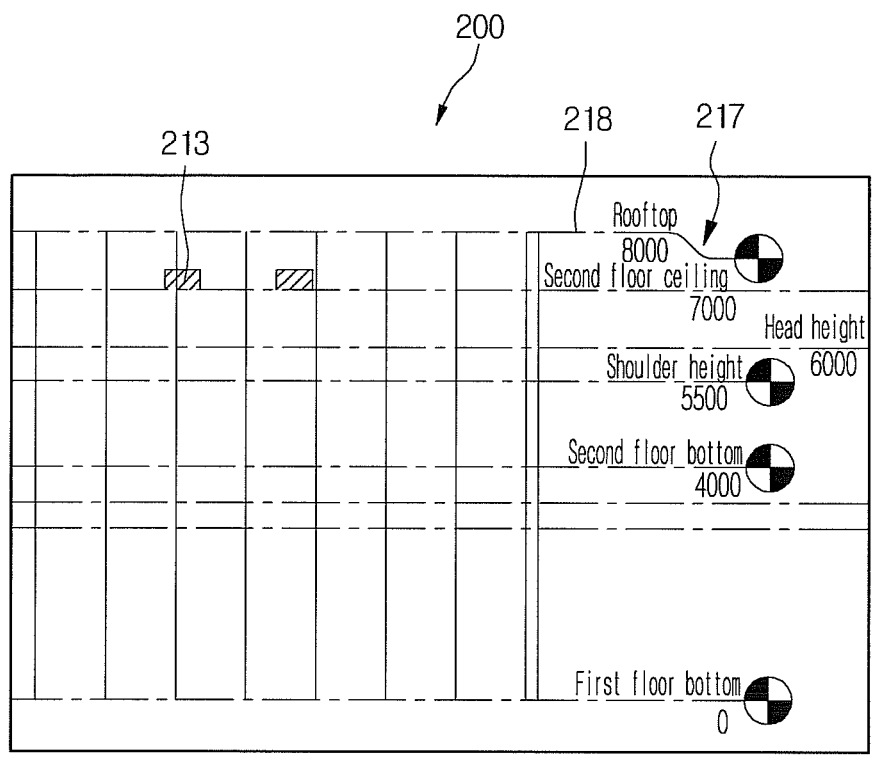

FIG. 4 is a view of an indoor unit automatic disposition display part according to an embodiment, and FIGS. 5 and 6 are views of a drawing display part on which the indoor unit is automatically displayed according to an embodiment.

When a specific input part included in the system 10 is inputted, as shown in FIG. 4, an indoor unit automatic disposition display part 240 may be displayed on the display 20.

The indoor unit automatic disposition display part 240 may include a model display part 241 for selecting a type or model of the indoor unit to be installed, a shape display part 241a on which a shape of the indoor unit having the model selected in the model display part 241 is displayed, and a disposition information display part 242 on which disposition information with respect to the indoor unit having the selected model.

The disposition information display part 242 may include a disposed position of the indoor unit, e.g., a disposition division display part 243 ("Disposition Division") for selecting whether the indoor unit is installed at a center of the room or on a wall, a room information display part 244 ("room information") for displaying information of a room in which the indoor unit is installed, and an arrangement set display part 245 ("Spacing and Direction") for displaying information with respect to a disposition distance of the indoor unit.

The disposition division display part 243 may include a plurality of selectable disposition divisions. The plurality of disposition divisions may include a "central disposition" in which the selected indoor unit is disposed with respect to a center of the corresponding room, a "wall disposition" in which the selected indoor unit is disposed with respect to four directional walls, and a "user defined disposition" in which a user sets a disposition reference point of the indoor unit.

A room area and load information (e.g., actual load information) and information with respect to capacity of the indoor unit may be disposed on the room information display part 244. In detail, when one model of the indoor unit is selected through the model display part 241, capacity information with respect to the selected model (indoor unit), area information with respect to the room, and load information may be displayed.

Also, an optimum number of selected indoor units to be installed in the corresponding room may be recommended on the basis of the above-described information. That is, the "recommended number" of selected indoor units may be displayed on the room information display part 244. Thus, since the recommended number of indoor units that should be disposed and how the indoor units should be arranged according to the capacity of the indoor, the actual area, and the load information are provided, user convenience may be improved.

Information with respect to column and row of the indoor units to be disposed, e.g., information with respect to the number C of columns and the number W of rows may be inputted into the room information display part 244. The number C of columns and the number W of rows may be previously determined as predetermined values according to the recommended number and then displayed on the room information display part 244. That is, the number of indoor units to be installed and the information C and W with respect to the column and row may be recommended to the user. However, the user may change the information to reflect a desired number of columns and rows.

The room information display part 244 may include a plan disposition view 244a that illustrates a plan disposition of the indoor units according to the recommended number and the number C and W of columns and rows.

The information with respect to the columns and rows of the indoor units, e.g., the C*W values may be understood as the number of indoor units to be installed. The recommended number and the inputted indoor unit number C*W may correspond to each other or be different from each other. When the recommended number and the indoor unit number C*W are different from each other, the indoor units may be disposed according to the number C*W of the indoor units inputted by the user and the column and row information.

Also, when the number of indoor units recommended by the system 10 and the column and row information and the information inputted or adjusted by the user are different from each other, the arrangement of the indoor units installed according to the information inputted by the user may be displayed on the plan disposition view 244a.

Information with respect to how the inputted indoor unit number C*W are arranged, e.g., arrangement information may be displayed on the arrangement set display part 245. The arrangement information may include a distance F (hereinafter, referred to as a column distance) between one indoor unit and the other indoor unit which constitute the columns, a distance M (hereinafter, referred to as a row distance) between one indoor unit and the other indoor unit which constitute the rows, and an angle A (hereinafter, referred to as an arrangement angle) of the column of the indoor unit to the wall of the room with respect to the column and row information.

The information with respect to the column distance F, the row distance M, and the arrangement angle A may be inputted. Also, the indoor units may be automatically disposed in the corresponding rooms on the basis of the information inputted into the arrangement set display part 245. Moreover, the information with respect to the arrangement angle A may be changed. Since the arrangement angle A may be corrected to simply change the arrangement of the indoor units, the disposition design of the indoor units may be made easier.

As described above, since the indoor units may be automatically disposed in the corresponding rooms when the type and model of the indoor unit to be installed by the indoor unit automatic disposition system, it may not be necessary to dispose the indoor units one by one on the drawing display part 200 by the user.

A process of inputting data to the indoor unit automatic disposition display part 240 is described with reference to FIGS. 3 and 4. The user may select one room in which the indoor unit is installed on the building plan view 212 of FIG. 3. The selection may be performed by designating a predetermined region along a boundary between the rooms, e.g., an outer boundary by using a mouse. For example, as shown in FIG. 4, Room 1 of a plurality of rooms may be designated.

The user may select one type of indoor unit from the "outdoor unit type" displayed on the model display part 241 and then select one type of indoor unit that matches the selected indoor from the "indoor unit type." For example, as shown in FIG. 4, a "Multi V Super II" may be selected from the "outdoor unit type," a "Cassette 4 Way" may be selected from the "indoor unit type."

When one type of indoor unit is selected from the "indoor unit type," a plurality of indoor unit models belonging to the selected type may be displayed. When one model of the plurality of indoor unit models is selected, a shape of the indoor unit having the selected model may be displayed on the shape display part 241a. As illustrated in the example of FIG. 4, the model of the selected indoor unit may be a "ceiling type indoor unit" installed on a ceiling.

The user may select a desired disposition division from the disposition division display part 243 (e.g., a central disposition, as shown in FIG. 4). Information with respect to the selected Room 1, e.g., the room area, the room load, and the capacity of the selected indoor unit, may be displayed on the room information display part 244.

Also, the adequate number of indoor units to be installed may be recommended and displayed on the room information display part 244 on the basis of the information with respect to the Room 1 and the capacity of the indoor unit (two indoor units in FIG. 4). The user may input or correct the columns and rows of the indoor units according to the recommended number of indoor units.

The information with respect to the specific column distance, row distance, and arrangement angle may be displayed on the arrangement set display part 245 according to the set number of indoor units and the room area. However, the user may correct the information with respect to the column and row distances and the arrangement angle.

As described above, when a "confirmation button" is selected after the information displayed on the indoor unit automatic disposition display part 240 is confirmed or inputted, as shown in FIG. 5, the indoor units may be automatically disposed in the corresponding rooms of the building plan view (212). Here, the user may designate the region (the installation region of the indoor unit) corresponding to the Room 1 on the drawing display part 200.

For example, as shown in FIG. 5, two indoor units may be disposed, spaced apart from each other, on a central portion of the ceiling of the Room 1. Also, two indoor unit display parts 213 corresponding to the indoor units may be displayed to be within the displayed boundary of Room 1.

When the building height display part 151 of the project display part 150 is selected in the state where the indoor units are automatically disposed, as shown in FIG. 6, the level or height of each of components of the building and a configuration of the ceiling type indoor unit may be displayed on the drawing display part 200.

In detail, FIG. 6 illustrates a state in which the indoor unit display part 213 is disposed on a ceiling of the second floor at a height of about 7,000 mm (about 23 feet) that is spaced upward from the first floor bottom. Here, as described in FIG. 2, the plurality of level display lines 218 and the position display part 217 are disposed on the drawing display part 200.

Figure 7:
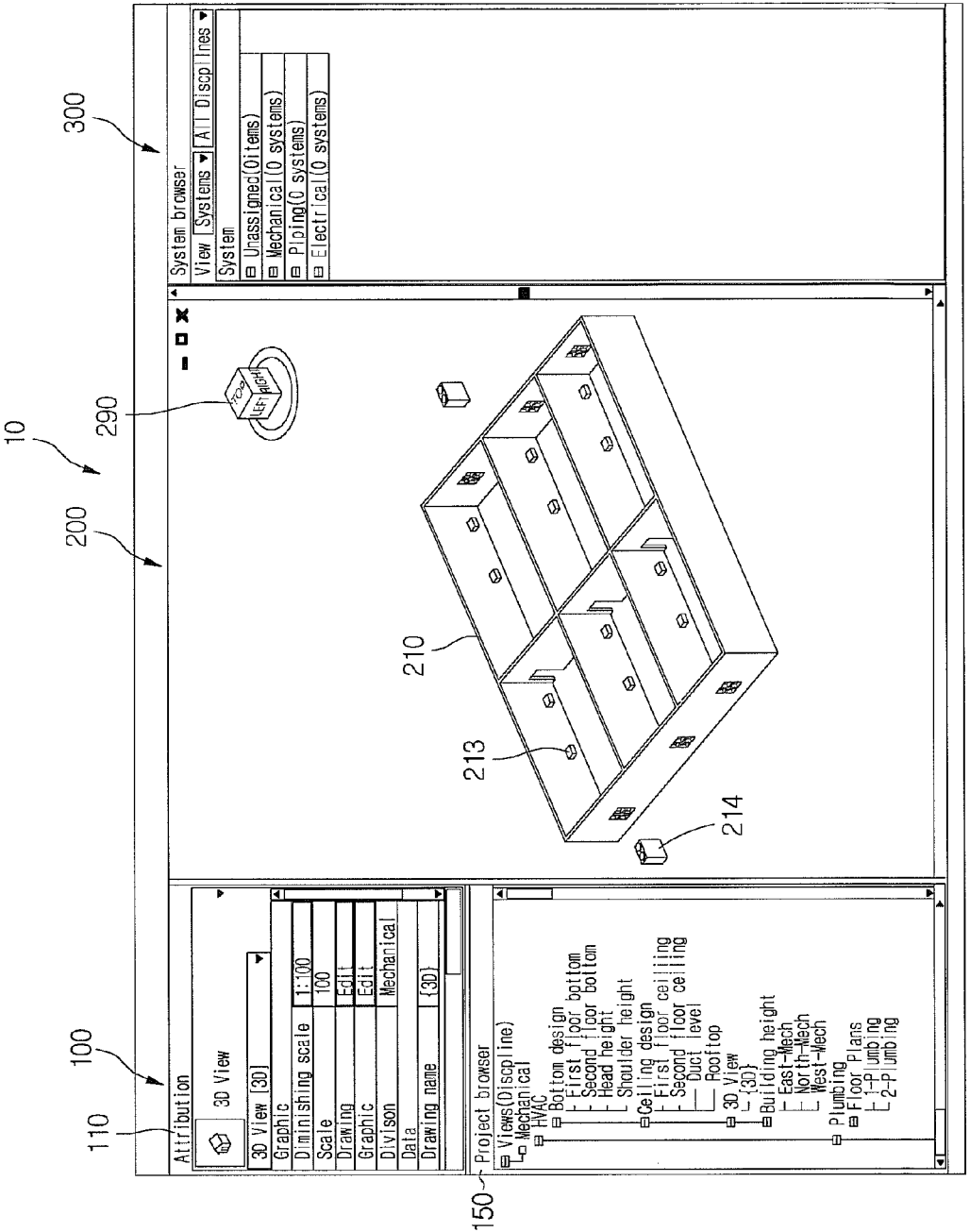
FIG. 7 is a view of the installation guide system including the drawing display part on which the indoor unit is automatically disposed according to an embodiment.

FIG. 7 is a view of the installation guide system including the drawing display part on which the indoor unit is automatically disposed according to an embodiment. When the indoor units are automatically disposed in the plurality of rooms through the method described in FIGS. 4 to 6, the building perspective view 210 including the plurality of indoor unit display parts 213 may be displayed on the drawing display part 200.

Also, an outdoor unit display part 214 may be displayed on an outer region of the building perspective view 210 on the drawing display part 200. The outdoor unit display part 214 may be understood as the outdoor unit corresponding to the automatically disposed indoor unit which are displayed.

The disposition of the outdoor unit may be performed before or after the indoor unit of FIGS. 4 to 6 is automatically disposed. When a model of the outdoor unit to be installed is selected, and a predetermined region (an installation position region) is set on the drawing display part 200, the outdoor unit display part 214 may be disposed in the predetermined region of the drawing display part 200.

The viewer adjustment part 290 may be disposed on a side of the building perspective view 210. When the viewer adjustment part 290 is selected to rotate in a predetermined direction, the building perspective view 210 may be changed in shape according to the rotation direction. As described above, the viewer adjustment part 290 may be adjusted to easily confirm the installed configurations of the indoor and outdoor units within the building.

Figure 8:
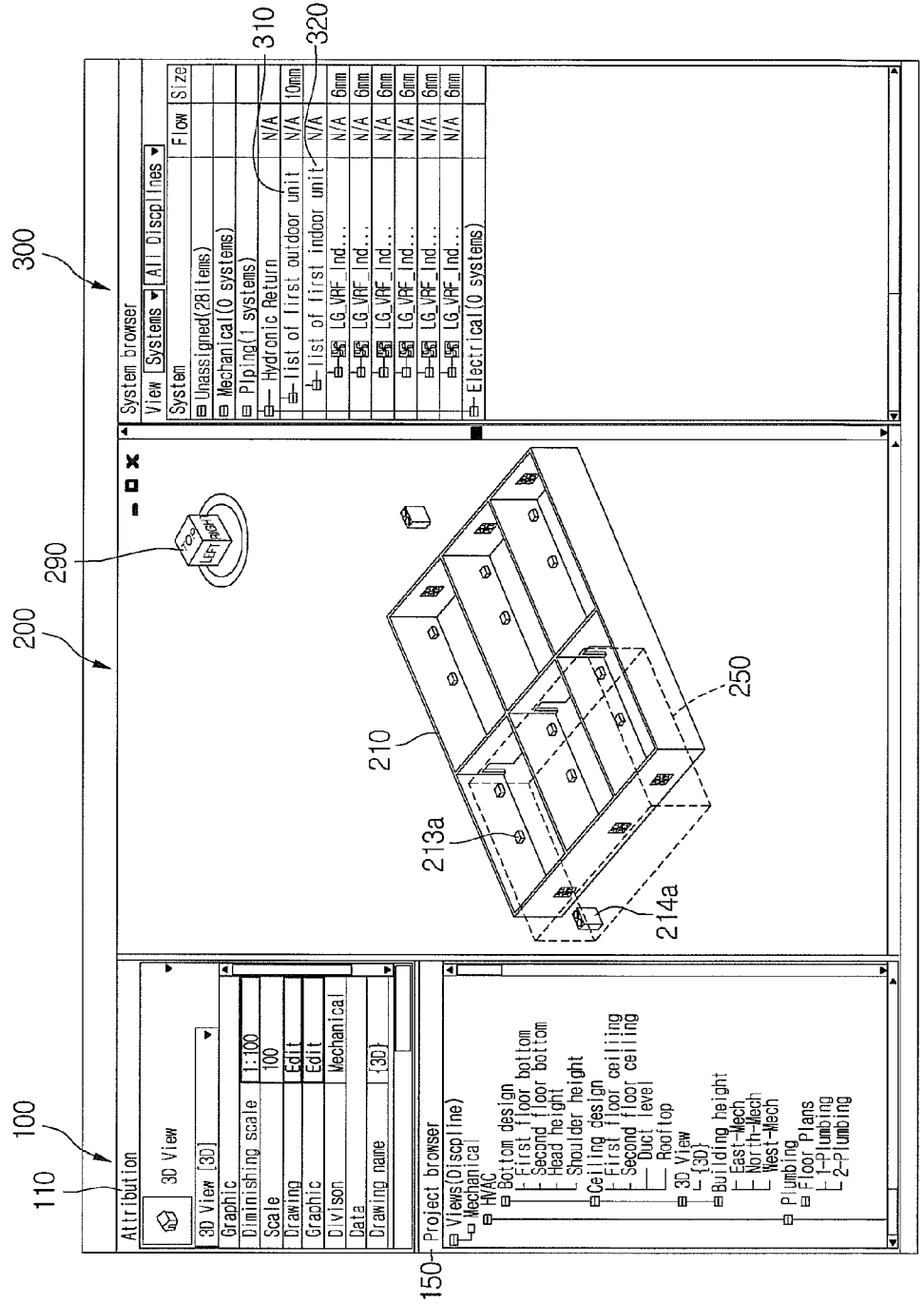
FIG. 8 is a view of the installation guide system in which a first group of outdoor and indoor units is defined to connect tubes to each other according to an embodiment.

FIG. 8 is a view of the installation guide system in which a first group of outdoor and indoor units is defined to connect tubes to each other according to an embodiment. A first group of indoor and outdoor units for connecting tubes to each other may be designated in a state where the indoor and outdoor units are disposed on the drawing display part 200.

In detail, the drawing display part 200 may include a first indoor unit display part 213a indicating one or more indoor units disposed on a side of the inside of the building (a room of the first group) and a first outdoor unit display part 214a indicating an outdoor unit disposed outside the building.

Also, the drawing display part 200 may further include a first system connection line 250 connecting the plurality of first indoor unit display parts 213a and the first outdoor unit display parts 214a to each other to form one air conditioner system. A process for forming the first system connection line 250 will be described hereinafter.

First, the first outdoor unit display part 214a is designated. For example, the first outdoor unit display part 214a may be selected by using a mouse, or one region including the first outdoor unit display part 214a may be dragged using the mouse to designate the first outdoor unit display part 214a.

Then, the plurality of first indoor unit display part 213a may be designated. For example, the plurality of first indoor unit display parts 213a may be selected by using the mouse, where a region including the plurality of indoor unit display parts 213a may be selected by dragging the mouse to designate the plurality of first outdoor unit display parts 214a. It should be appreciated that the desired indoor unit display parts 213a may also be selected individually.

When the first outdoor unit display part 214a and the plurality of first indoor unit display parts 213a are completely designated, the first system connection line 250 may be displayed on the drawing display part 200. The first system connection line 250 may be displayed to define a specific region so that the first system connection line 250 includes the first outdoor unit display part 214a and the plurality of first indoor unit display parts 213a therein. For example, as shown in FIG. 8, the first system connection line 250 may have a hexahedral shape.

Also, a first outdoor unit list 310 corresponding to the designated first outdoor unit display part 214a may be displayed on the product information display part 300. A type and/or model name corresponding to the outdoor unit may be displayed on the first outdoor unit list 310.

Also, a first indoor unit list 320 corresponding to the plurality of designated indoor unit display parts 213a may be displayed on the product information display part 300. The type and/or model names of the plurality of indoor units may be displayed on the first indoor unit list 320 to correspond to the designated indoor unit display part 213a.

Figure 9:
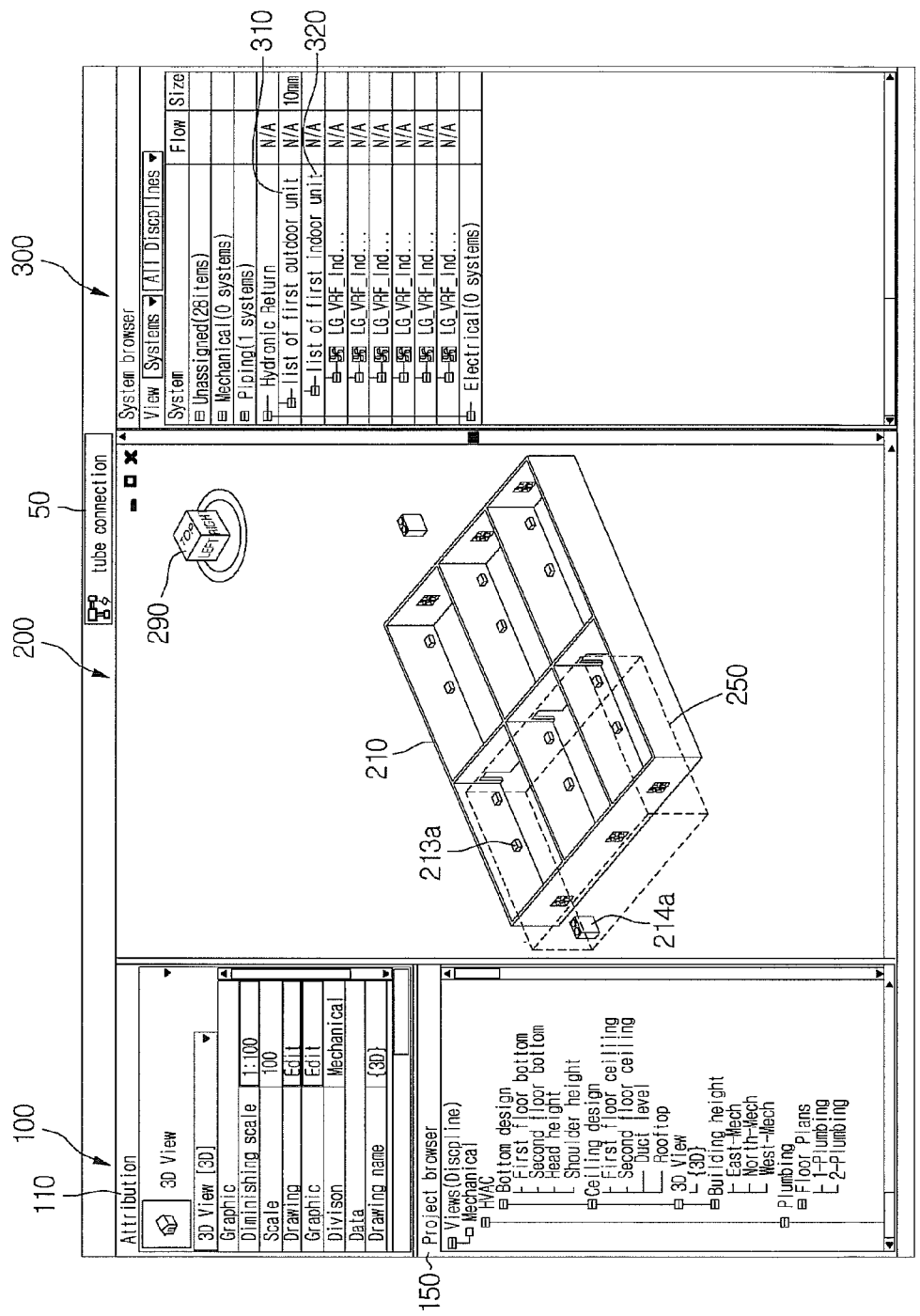
FIG. 9 is a view of the installation guide system in which a predetermined command is inputted to connect tubes of the first group of the outdoor and indoor units to each other.

FIG. 9 is a view of the installation guide system in which a predetermined command is inputted to connect tubes of the first group of the outdoor and indoor units to each other.

As shown in FIG. 8, in the state where the first group of indoor and outdoor units are connected to the system, when one point within an inner space or boundary defined by the first system connection line 250 is selected, a tube connection input part 50 may be displayed on the display 20. The tube connection input part 50 may be an icon, button, or the like.

When the tube connection input part 50 is selected, a disposition of a tube connecting the first group of outdoor and indoor units to each other may be recommended. For example, the tube may include a liquid tube, a gas tube, a drain tube, or the like. Hereinafter, the recommendation with respect to the connection method of the tube will be described.

Figure 10:
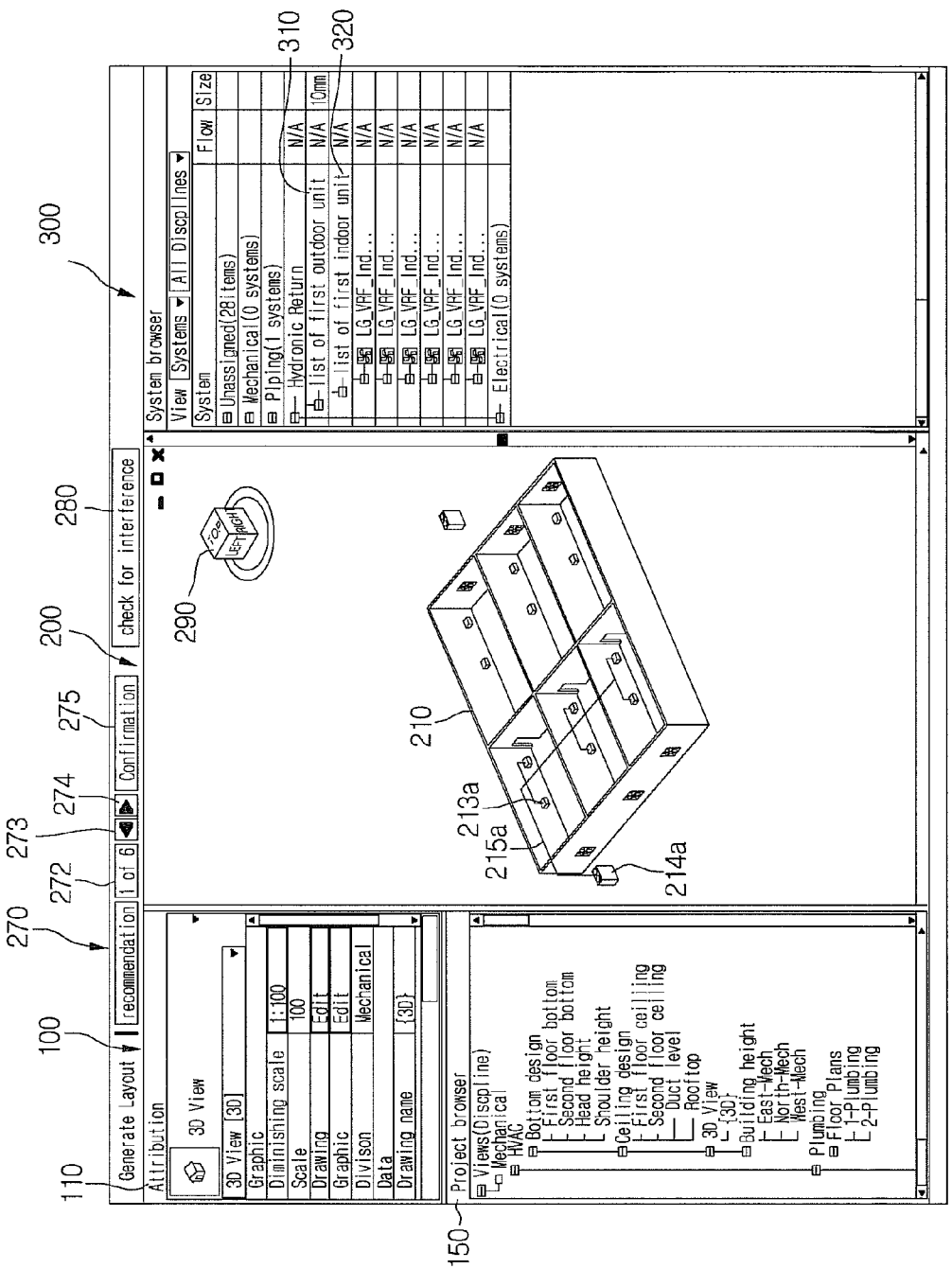
FIG. 10 is a view of the installation guide system in which the outdoor and indoor units are connected to each other through a recommendation tube according to an embodiment.

FIG. 10 is a view of the installation guide system in which the outdoor and indoor units are connected to each other through a recommendation for a tube configuration. When the tube connection input part 50 is selected in FIG. 9, a recommendation display part 270 for displaying recommendation information of a specific tube connection method is displayed on the display 20.

The recommendation display part 270 may include a recommendation order display part 272 for displaying one recommendation method of the recommendation with respect to the plurality of connection methods and a pair of directional arrows 273 and 274 (also referred to herein as taps) which are selected for viewing the connection method according to the recommended order (or rank). The recommendation order display part 272 displays information with respect to the recommended order of the recommendation tubes displayed on the drawing display part 200. The recommendation display part 270 may be a status bar, for example, that provides information regarding the available recommended configurations as well as enabling selection of one or more of the recommended configurations.

The pair of directional arrows 273 and 274 include a first directional arrow 273 that may be selected for selecting a higher priority connection method and a second directional arrow 274 that may be selected for selecting a lower priority connection method on the basis of the recommended order. When the first and second directional arrows 273 and 274 are selected, the installed states of the connection tubes may be successively displayed (or changed) according to the set priority order.

For example, as illustrated in FIG. 10 illustrates a first of six connection methods are available for connecting the first group of outdoor and plurality of indoor units to each other. Here, "1 of 6" may be displayed on the recommendation order display part 272.

Also, the first outdoor unit display part 214a and a recommended tube 215a connecting the plurality of first indoor unit display parts 213a to each other may be displayed on the drawing display part 200.

If the second directional arrow 274 is selected once in the state of FIG. 10, a second in the order of connection methods may be displayed. Here, "2 of 6" may be displayed on the recommendation order display part 272. The second connection recommendation may be a second connection configuration recommended based on various criteria, as described hereinafter. Also, a recommendation tube having a structure different from that of the recommendation tube 215a may be displayed.

Thus, in the current embodiment, the six tube connection methods may be recommended through the above-described manner. Of course, the present disclosure is not limited to the number of recommended tube connection methods.

The user may select one tube connection method of the plurality of recommended tube connection methods. For example, when the confirmation arrow 275 is selected in a state where the recommendation tube is displayed on the drawing display part 200, the corresponding recommendation tube may be decided as the connection tube configuration.

The six tube connection methods may be proposed as installable tube structures on the basis of the structure of the building, the capacity (performance) of the outdoor unit, the capacity (performance) of the indoor unit, or the load information of the room in which the indoor unit is installed. Here, the first order of tube connection method, e.g., the first recommendation tube 215a may be understood as the most adequate tube connection method in consideration of the costs and installation difficulty of the tubes.

Although the directional arrows 273 and 274 are selected to successively display the installed configurations of the recommendation tubes in the above-described embodiment, the present disclosure is not limited thereto. For example, when the installed configuration according to the first priority order elapses for a set time, the installed configuration according to the second priority order may be automatically displayed on the drawing display part 200. Also, the displayed recommended configurations may wrap-around from 6 to 1, for example.

Although the installed configurations of the recommendation tubes are manually or automatically and successively displayed in the above-described embodiment, the present disclosure is not limited thereto. For example, the plurality of installed configurations with respect to the recommendation tubes may be displayed on the drawing display part 200 at the same time. The user may select one among the plurality of concurrently displayed to implement the desired connection of the tubes to each other.

Figure 11:
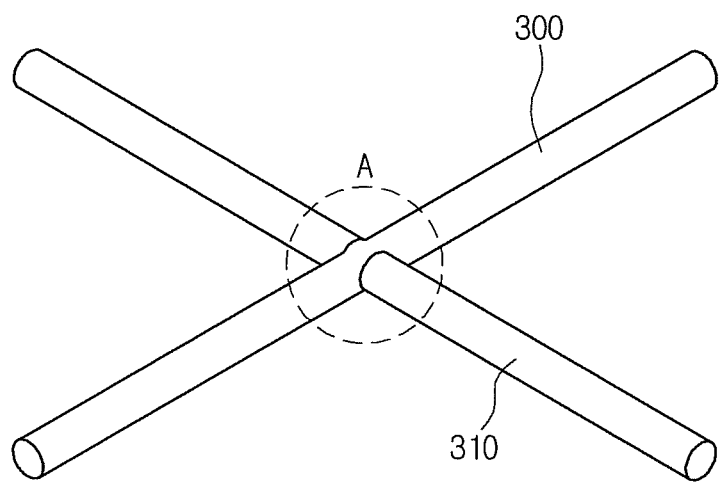
FIG. 11 is a view illustrating a state in which a plurality of tubes interfere with each other according to one embodiment.
Figure 12:
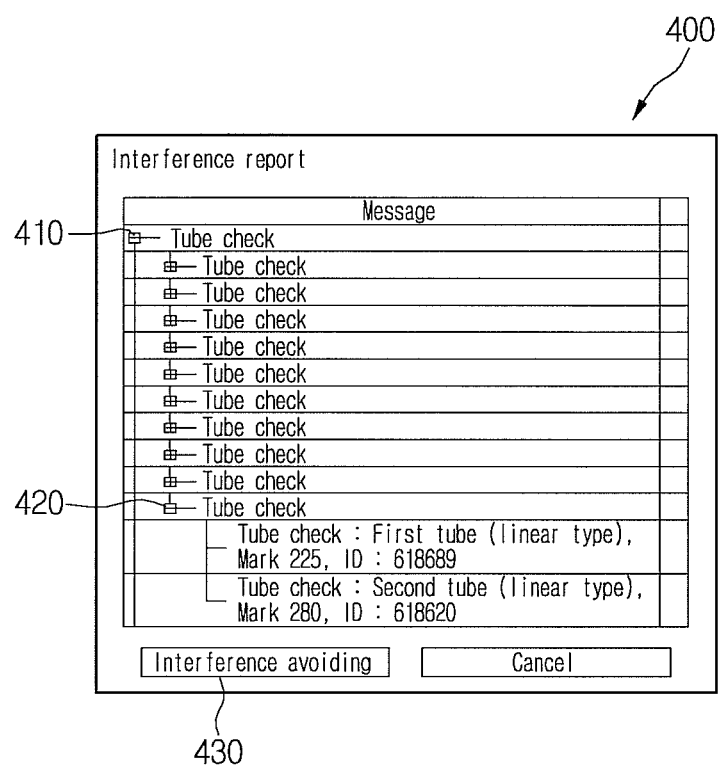
FIG. 12 is a view illustrating a list of the tubes interfering with each other.
Figure 13:
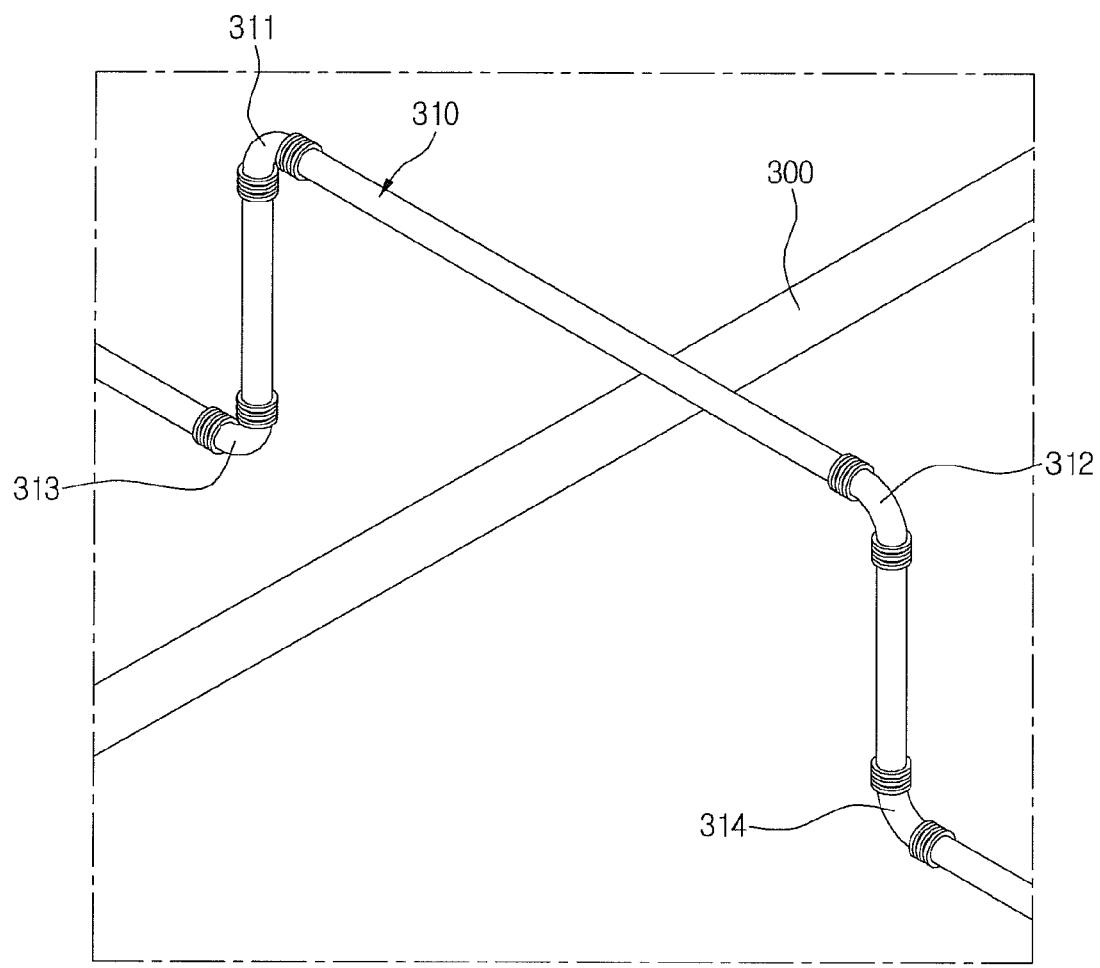
FIG. 13 is a view illustrating a state in which the tubes of FIG. 11 do not interfere with each other.

FIG. 11 is a view illustrating a state in which a plurality of tubes interfere with each other, FIG. 12 is a view illustrating a list of the tubes interfering with each other, and FIG. 13 is a view illustrating a state in which the tubes of FIG. 11 do not interfere with each other.

Referring to FIG. 11, when a plurality of tubes are installed through the method described in FIGS. 8 to 10, the plurality of tubes may interfere with each other. In detail, a tube connecting an outdoor unit to an indoor unit may include a liquid tube in which a liquid refrigerant flows, a gas tube in which a gases refrigerant flows, and a drain tube in which drain water (condensed water) flows. Also, due to a complex structure of an air conditioner system in which a plurality of indoor units are connected to one outdoor unit, when the tubes are installed, the plurality of tubes may physically interfere with each other.

A state in which the plurality of tubes physically interfere with each other includes a state in which the plurality of tubes are disposed to cross or intersect perpendicular to each other and a state in which the plurality of tubes extend parallel to each other to partially overlap each other. Interference based on physical interference as well as incompatible types of tubes (e.g., too closely positioned conflicting type of pipes) may be detected.

FIG. 11 illustrates a state in which the plurality of tubes are disposed crossing each other to physically interfere with each other. FIG. 11 illustrates a state in an interference region A between a first tube 300 and a second tube 310. The interference region A may be a region in which the first tube 300 and the second tube 310 cross each other. Also, the first and second tubes 300 and 310 may cross each other through the interference region A to communicate with each other.

For example, the first tube 300 may be one of the liquid tube, the gas tube, or the drain tube. The second tube 310 may be the other one of the liquid tube, the gas tube, or the drain tube.

In another example, the first tube 300 may be one of a main tube in which the refrigerant (or condensed water) flows or a branch tube branched from the main tube. Also, the second tube 310 may be the other one of the main tube or the branch tube. That is, the first and second tubes 300 and 310 may be different types of tubes distinguished from each other. Also, the first and second tubes 300 and 310 may be understood as tubes in which the fluids flowing therethrough cannot be mixed with each other, or should not be mixed with each other.

Thus, as shown in FIG. 11, the state in which the first and second tubes 300 and 310 cross each other to communicate with each other may represent a state in which an error of the tube installation occurs.

In FIG. 10, after the tubes are completely installed, when an interference confirmation input part 280 included in the display 20 is selected, the system 10 may check whether the plurality of installed tubes interfere with each other. If interference between tubes exist, a tube information display part 400 as illustrated in FIG. 12 may be displayed on the display 20. For example, the tube information display part 400 may a pop-up window or a separate window or display region on the drawing display part 200.

The tube information display part 400 may include a tube check list 410 on which a plurality of tube lists is displayed. The tube check list 410 displays the term "tube check" with respect to the tubes that do not interfere with each other.

The tube information display part 400 may include an interference occurrence display part 420 for displaying detailed information with respect to the tube interfering with each other. Information with respect to at least two tubes interfering with each other is displayed on the interference occurrence display part 420.

For example, a state in which the first and second tubes interfere with each other may be displayed on the interference occurrence display part 420. The term "tube check: first tube (linear type), Mark 225, ID: 618647" may be displayed on a first row of the interference occurrence display part 420. This may represent that the first tube having a linear shape is disposed on a position of the number 225 of the building structure drawing, and an ID 618647 is provided as a product code.

The term "tube check: second tube (linear type), Mark 280, ID: 618620" may be displayed on a second row of the interference occurrence display part 420. This may represent that the second tube having a linear shape is disposed on a position of the number 280 of the building structure drawing, and an ID 618620 is provided as a product code.

When the interference occurrence display part 420 is selected, the state in which the first and second tubes interfere with each other may be confirmed through the drawings such as FIG. 11. For example, the interference between the tubes illustrated in FIG. 11 may be displayed on the drawing display part 200.

The tube information display part 400 may include a selectable interference avoiding selection part 430 to automatically provide solutions to avoid the tube interference. When the interference avoiding selection part 430 is selected, installation positions or extension directions of the first and second tubes may be changed so that the first and second tubes do not interfere with each other or any other tubes which are present.

FIG. 13 illustrates a state in which the tubes are designed to avoid the interference therebetween when the interference avoiding selection part 430 is inputted with respect to the interfering tubes of FIG. 11. For example, at least one portion of the second tube 310 may be bent in a set direction to prevent the second tube 310 from interfering with the first tube 300. In detail, the second tube 310 may include a plurality of bent parts which are provided by changing the extension direction of the second tube 310 at a position adjacent to the first tube 300. The bent parts may be a fitting or adapter having various shapes and configurations, such as elbow fittings, sweep elbow fittings, or the like.

The plurality of bent parts may include a first bent part 311, a second bent part 312, a third bent part 313, and a fourth bent part 314. The plurality of bent parts 311, 312, 323, and 314 may be a bent tube in which the second tube 310 is bent.

When at least two tubes cross and interfere with each other as shown in FIG. 11, information for avoiding the interference between the tubes as shown in FIG. 13 may be previously stored in a memory 23 (see FIG. 13) of the system 10.

Although four bent parts are provided in the second tube to avoid the interference with the first tube 300 in FIG. 13, four or more or less bent parts may be provided to avoid the interference therebetween.

As described above, when at least two tubes interfere with each other, since detailed information of the interfering tubes is confirmed to automatically avoid the interference therebetween, the installation of the air conditioner may be made easier.

Moreover, rather than using the bent parts in the interfering tube to avoid the interference therebetween in FIG. 13, at least one interfering tube may be moved vertically (or horizontally) to avoid the interference therebetween.

Although the interference avoiding selection part 430 is inputted to automatically avoid the interference between the tubes as illustrated in FIG. 13, the user may confirm the interfering tubes and then change an installation position and extension direction of the tubes to avoid the interference therebetween.

Figure 14:
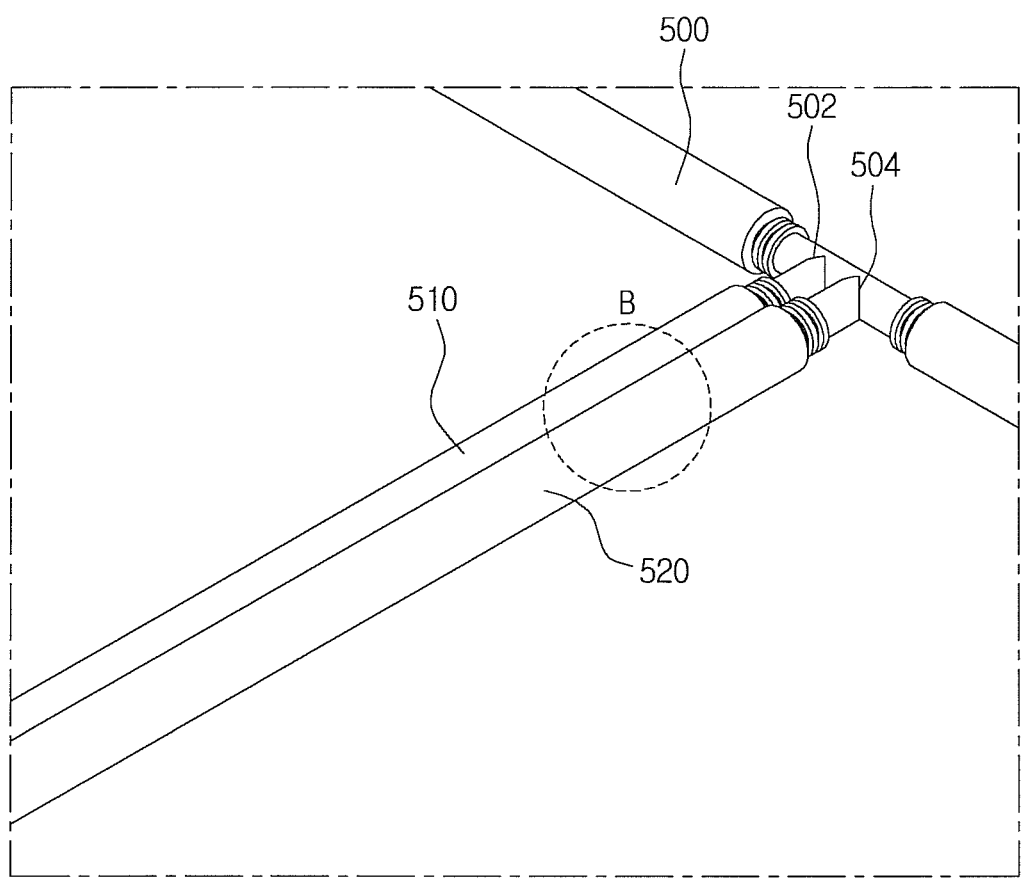
FIG. 14 is a view illustrating a state in which a plurality of tubes interfere with each other according to one embodiment.
Figure 15:
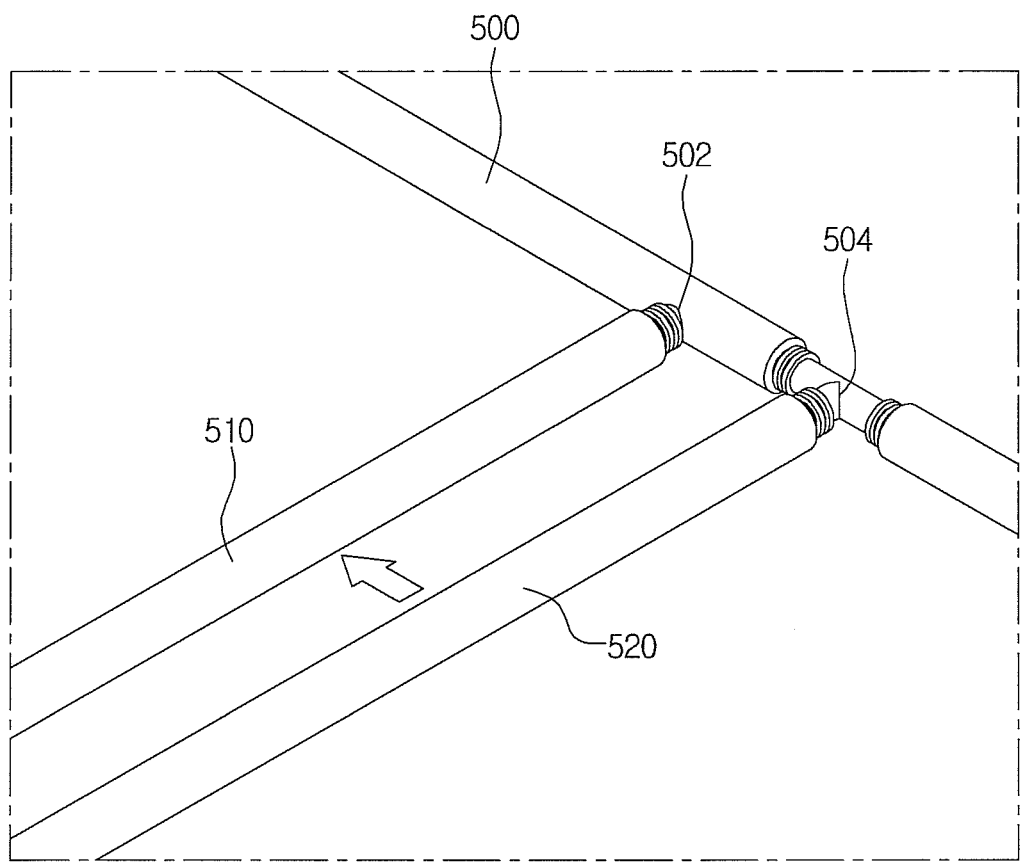
FIG. 15 is a view illustrating a state in which the tubes of FIG. 14 do not interfere with each other.

FIG. 14 is a view illustrating a state in which a plurality of tubes interfere according to another example, and FIG. 15 is a view illustrating a state in which the tubes of FIG. 14 do not interfere with each other.

Referring to FIG. 14, at least two tubes that extend parallel to each other may interfere with each other by overlapping each other in a predetermined region. A fourth tube 510 and a fifth tube 520 may be connected to a third tube 500. The fourth tube 510 may be coupled to a first connection part 502 of the third tube 500, and the fifth tube 520 may be coupled to a second connection part 504 of the third tube 500.

Here, the third tube 500 may be, for example, a main tube for a refrigerant (or condensed water), and the fourth and fifth tubes 510 and 520 may be branch tubes branched from the third tube 500.

The fourth tube 510 and the fifth tube 520 may be disposed parallel to each other to extend in one direction. Here, at least one portion of the fourth tube 510 and at least one portion of the fifth tube 520 may interfere with each other in an interference region B. The interference region B may be a region in which the fourth tube 510 and the fifth tube 520 contact each other or overlap each other in the same region. Interference may also exist if the tubes are within a prescribed distance relative to each other, for example, when two conflicting types of tube are positioned too close to each other.

As described above, in a state where the tubes interfere with each other, when the interference avoiding selection part 430 of FIG. 12 is selected, at least one of the fourth and fifth tubes may be moved to avoid the interference therebetween. For example, as shown in FIG. 15, the fourth tube 510 may be moved in a direction away from the fifth tube 520. That is, the fourth tube 510 may be moved to a position parallel to its original position and spaced apart from the fifth tube 520. Also, the first connection part 502 of the third tube 400 connected to the fourth tube 410 may also move in a direction away from the second connection part 504. Thus, when the plurality of tubes 510 and 520 extend parallel to each other, and at least portions of the tubes contact or overlap each other to interfere with each other, at least one tube may be moved to space the tubes from each other, thereby avoiding the interference therebetween.

Although the fourth tube 510 is described as being moved in FIG. 15, it should be understood by a person skilled in the art that the fifth tube 520 may alternatively be moved to change the installation position thereof.

Figure 16:
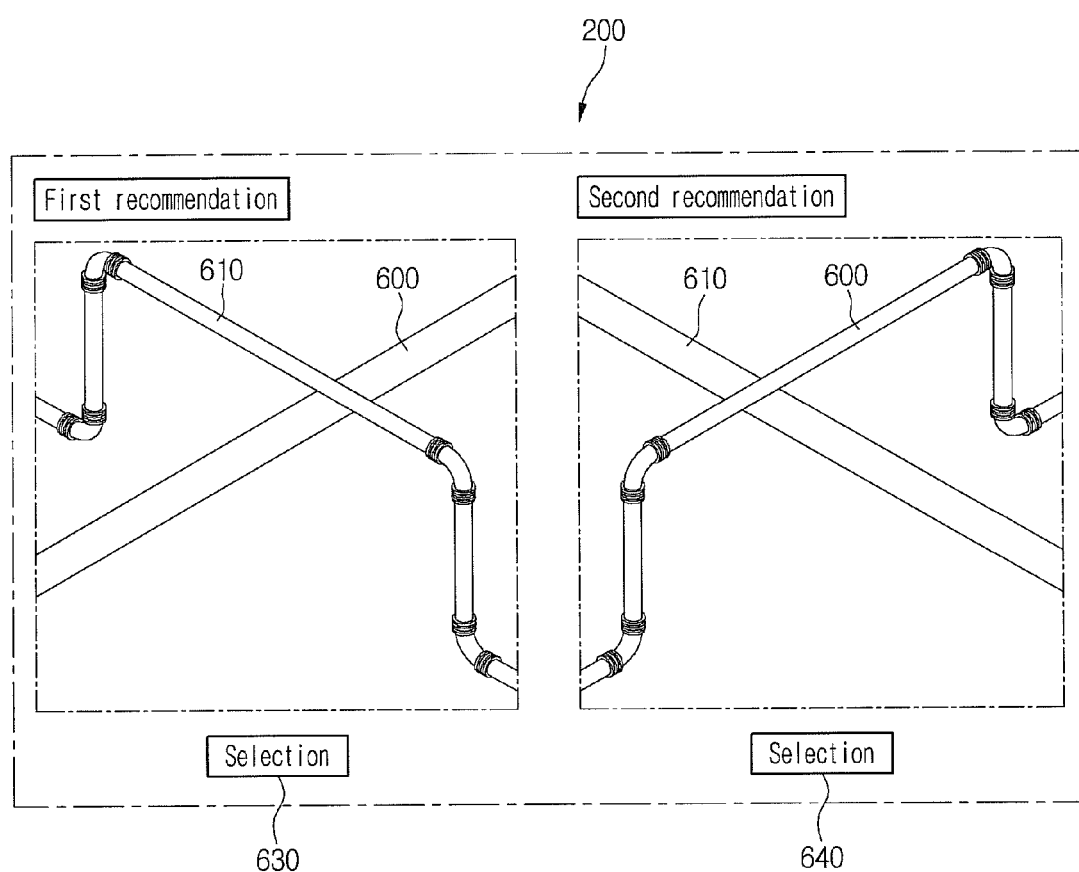
FIG. 16 is a view illustrating a state in which tubes do not interfere with each other according to one embodiment.

FIG. 16 is a view illustrating a state in which tubes do not interfere with each other according to one embodiment. When interference between a plurality of tubes 600 and 610 occurs, various method for avoiding the interference therebetween may be proposed.

In detail, when the first and second tubes 600 and 610 interfere with each other, the first tube 600 may be changed in position and extension direction as a first method, or the second tube 610 may be changed in position and extension direction as a second method. In this case, a plurality of methods for avoiding the interference between the tubes may be comparably displayed on the drawing display part 200. The plurality of methods may be understood as recommendations for avoiding interference, which are provided to the user.

For example, the drawing display part 200 may illustrate a structure in which the second tube 610 is changed in extension direction as a first recommendation method to avoid interference with the first tube 600, and the first tube 600 is changed in extension direction as a second recommendation method to avoid interference with the second tube 610.

Here, the first recommendation method may have a priority order higher than that of the second recommendation method. The priority order may be decided based on cost in changing the configuration of the tubes or the ease with which the tubes may be installed in consideration of a type, diameter, length of the tubes, or the like.

Thus, it may be understood as the first recommendation method is relatively inexpensive or easily installed when compared to the second recommendation method. For example, since the second tube 610 has a diameter less than that of the first tube 600, the second tube may be relatively easily processed. Also, the second tube 610 may be a branch tube that is capable of being relatively easily changed, and the first tube 600 may be a main tube which may be difficult to change.

The user may select one of the recommendations for avoiding interference displayed on the drawing display part 200. For example, when it is intended to select the first recommendation method, the first recommendation selection part 630 may be selected. Also, when it is intended to select the second recommendation method, the second recommendation selection part 640 may be selected.

An avoiding method corresponding to the recommendation selected by the user may be a method in which the tubes are changed in the installation structure. As described above, the system 10 may automatically avoid the interference between the tubes, and also, the user may select a recommended method for avoiding the interference.

Although the first and second recommendation methods are comparably displayed on the drawing display part 200 in FIG. 16, the first recommendation method may be displayed first, and then a screen may be switched to display the second recommendation method. That is, the first and second recommendation methods may be successively displayed on the drawing display part 200.

Figure 17:
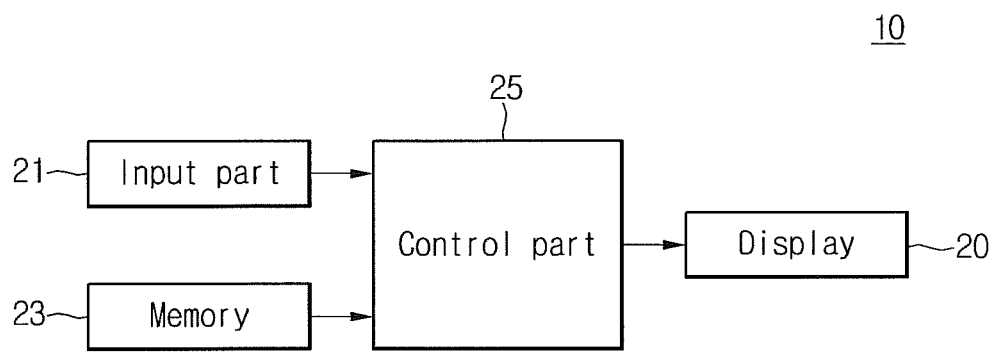
FIG. 17 is a block diagram of the installation guide system according to an embodiment.

FIG. 17 is a block diagram of the installation guide system according to an embodiment. An installation guide system 10 may include an input part 21 to input a predetermined command for disposition design of an air conditioner, a memory 23 to store information with respect to a space in which the air conditioner is installed and information with respect to the components of the air conditioner, a display 20 to display a process for the disposition design of the air conditioner, and a control part 25 to control the components.

The input part 21 may include a keyboard or mouse for a computer. However, a user's command can be input into the installation guide system 10 using any appropriate method of inputting commands.

Drawing information including at least one of information of a building in which the air conditioner is installed, floor information, and room information may be stored in the memory 23. The drawing information may be received from a customer (e.g., landlord or building designer) and then stored in the system 10.

When the disposition of the air conditioner is designed, the drawing information may be displayed on the display 20, for example, a drawing display part 200. Also, a specific group of outdoor and indoor units and a connection tube connecting the outdoor and indoor units to each other together with the drawing information may be displayed on the drawing display part 200 according to the contents described above.

Also, equipment constituting the air conditioner, for example, information with respect to a tube, information with respect to an installation changing structure of the tube for avoiding interference between tubes, and information with respect to a recommendation method for avoiding the interference and a recommendation priority order may be previously stored in the memory 23.

In the installation guide system of the air conditioner according to the embodiments, since the installation conditions of the building may be stored as an actual drawing with respect to the building, and then the air conditioner may be selected or installed adequate for the stored installation conditions, the air conditioner may be optimally installed adequate for the installation conditions of the building.

Also, since the number of indoor units to be installed may be decided or recommended by calculating required cooling/heating capacity on the basis of the space information or use information (heat generation rate) of the building, the air conditioner may be easily installed.

Also, since the indoor units may be automatically disposed on the basis of the actual area and load information of the room in which the air conditioner is installed and the information with respect to the selected indoor unit, the indoor unit may be easily designed and disposed.

Also, since the disposition of the tube connecting the indoor unit to the outdoor unit, for example, the dispositions of the liquid tube, the gas tube, and the drain tube may be recommended in the state where the indoor unit and the outdoor unit are disposed, and an adequate tube may be selected and connected according to the structure of the building, the installation convenience of the air conditioner may be improved.

Also, when the plurality of tubes interfere with each other in the state where the indoor unit, the outdoor unit, and the tubes are disposed, since the interfering tube list may be automatically displayed to avoid the interferences between the tubes, the tubes may be easily installed.

Also, when the various avoiding methods for avoiding the interference between the tubes exist, since the optimum avoiding method may be recommended in consideration of the length or diameter of the tube, the user's convenience may be improved.

Also, since the installation guide system of the air conditioner is provided as drawing program, the designer may easily manipulate the drawing. In detail, since the main menu in which the installation information and product information have a glance may be provided on the display of the system, and the results obtained by selecting detailed menus of the main menu may be confirmed from the drawing, the design process may be accurately performed.

Embodiments provide an air conditioner installation guide system for guiding installation of an air conditioner and a method of using the same.

In one embodiment, an installation guide system for an air conditioner includes: a memory storing drawing information of a building in which the air conditioner including an outdoor unit and an indoor unit is installed; and a display providing a user interface to design a disposition of the air conditioner, wherein the display includes: a drawing display part displaying at least two tubes that are installed to connect the outdoor unit to the indoor unit; and when the two tubes interfere with each other, a tube information display part displaying information with respect to the interfering tubes.

In another embodiment, a using method of an installation guide system for an air conditioner includes: displaying a drawing display part including drawing information of a building; disposing an indoor unit and an outdoor unit which constitute the air conditioner; disposing a plurality of tubes connecting the indoor unit to the outdoor unit; and displaying information of interfering tubes when the plurality of tubes interfere with each other.

In further another embodiment, an installation guide system for an air conditioner includes: a display displaying drawing information of an installation space in which the air conditioner including an outdoor unit and an indoor unit is installed, wherein the display includes: an installation information display part including information with respect to the installation space in which the air conditioner is installed; a product information display part displaying information with respect to equipment of the air conditioner to be installed in the installation space; and a drawing display part on which disposition information of the equipment of the air conditioner is inserted into the drawing information of the installation space and displayed, wherein the drawing display part displays that at least two tubes interfere with each other after the at least two tubes connecting the outdoor unit to the indoor unit are completely disposed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An installation guide system for an air conditioner, the installation guide system comprising:
   a display that displays a user interface for designing an installation for an air conditioner, the display comprising:
   a first display part including installation information for installing the air conditioner and information related to an installation space in which the air conditioner is installed;
   a second display part including information of indoor units, outdoor units and a plurality of tubes connecting the indoor and the outdoor units; and
   a third display part that is disposed between the first and the second display parts and displays configuration of indoor units, outdoor units and the plurality of tubes installed in the installation space;
   a memory that stores at least one image for a building in which the air conditioner is installed; and
   a controller to control a display of the stored images on the user interface, wherein the user interface includes a tube information display part that displays information regarding an interference between at least two of the plurality of tubes,
   wherein the tube information display part includes:
   a tube check list on which the plurality of tube lists is displayed, the tube check list being configured to display information with respect to the tubes that do not interfere with each other;
   an interference occurrence display part configured to display interference information with respect to first and second tubes interfering with each other, the information of interference including product codes of the first and second tubes and position codes of the installation space in which the first and second tubes are installed; and
   an interference avoiding selection part to provide solutions to avoid interference of the first and second tubes,
   wherein the interference information includes a first information in which the first and second tubes cross each other and a second information in which the first and second tubes contact or overlap each other, wherein:
   when the interference avoiding selection part is selected while the interference occurrence display part displays the first information the third display part displays that the at least one portion of the second tube is bent in a set direction to prevent the second tube from crossing the first tube, and
   when the interference avoiding selection part is selected while the interference occurrence display part displays the second information, the third display part displays that the second tube is moved in a direction away from the first tube to prevent the second tube from contacting or overlapping the first tube.

2. The installation guide system according to claim 1, wherein the first tube is parallel with the second tube after being moved to avoid interference with the second tube.

3. The installation guide system according to claim 1, wherein the information displayed in the third display part on with respect to the change in positions of the first and the second tubes includes a plurality of recommended configuration of the first and the second tubes that avoid interference between the first and the second tubes.

4. The installation guide system according to claim 3, wherein the plurality of recommended configurations are arranged based on an order of priority based on at least one of a cost, a type, a diameter or length of the first and the second tubes that interfere with each other.

5. The installation guide system according to claim 1, wherein at least two recommended configurations for avoiding interference between the first and the second tubes are displayed in the first and the second, the at least two recommended configurations are displayed simultaneously or successively in the first and the second tubes.

6. A method of using an installation guide system for an air conditioner, the method comprising:
   displaying a drawing of a building on a display comprising:
   a first display part including installation information for installing the air conditioner and information related to an installation space in which the air conditioner is installed;
   a second display part including information of indoor units, outdoor units and a plurality of tubes connecting the indoor and the outdoor units; and
   a third display part that is disposed between the first and the second display parts and displays configuration of indoor units, outdoor units and the plurality of tubes installed in the installation space;
   displaying a plurality of graphical objects representing an indoor unit and an outdoor unit of an air conditioner on the drawing;
   displaying a plurality of tubes that connect the indoor unit to the outdoor unit;
   determining whether the plurality of tubes interfere with each other; and
   displaying information regarding the interfering tubes when at least one of the plurality of tubes interfere with another tube, in a tube information display part,
   wherein the tube information display part includes:
   a tube check list on which the plurality of tube lists is displayed, the tube check list being configured to display information with respect to the tubes that do not interfere with each other;
   an interference occurrence display part configured to display information of interference with respect to first and second tubes interfering with each other, the information of interference including product codes of the first and second tubes and position codes of the installation space in which the first and second tubes are installed; and an interference avoiding selection part to provide solutions to avoid interference of the first and second tubes, wherein the interference information includes a first information in which the first and second tubes cross each other and a second information in which the first and second tubes contact or overlap each other, wherein:

when the interference avoiding selection part is selected while the interference occurrence display part displays the first information, the third display part displays that the at least one portion of the first tube is bent in a set direction to prevent the first tube from crossing the second tube, and when the interference avoiding selection part is selected while the interference occurrence display part displays the second information, the third display part displays that the first tube is moved in a direction away from the second tube to prevent the first tube from contacting or overlapping the second tube.

7. The method according to claim 6, further including determining at least one recommended configuration of the first and the second tubes to correct the interference between the first and the second tubes, and displaying the at least one recommended configuration on the display.

8. The method according to claim 7, wherein the displaying the at least one recommended configuration includes displaying a plurality of recommended configuration of the first and the second tubes simultaneously or successively on the display.

9. The installation guide system according to claim 3, wherein an image of the interfering tubes based on the recommended configuration is displayed in a pop-up window.

* * * * *